United States Patent
Chen et al.

(10) Patent No.: US 11,126,047 B2
(45) Date of Patent: Sep. 21, 2021

(54) OCULAR OPTICAL SYSTEM

(71) Applicant: LIQXTAL TECHNOLOGY INC., Tainan (TW)

(72) Inventors: Hung-Shan Chen, Tainan (TW); Ming-Syuan Chen, Tainan (TW); Chien-Chung Chen, Tainan (TW)

(73) Assignee: LIQXTAL TECHNOLOGY INC., Tainan (TW)

( * ) Notice: Subject to any disclaimer, the term of this patent is extended or adjusted under 35 U.S.C. 154(b) by 35 days.

(21) Appl. No.: 16/360,032

(22) Filed: Mar. 21, 2019

(65) Prior Publication Data

US 2019/0293978 A1    Sep. 26, 2019

Related U.S. Application Data

(60) Provisional application No. 62/646,384, filed on Mar. 22, 2018.

(51) Int. Cl.
*G02F 1/1347* (2006.01)
*G02F 1/1337* (2006.01)
*G02C 9/00* (2006.01)
*G02F 1/13363* (2006.01)

(52) U.S. Cl.
CPC ............. *G02F 1/1347* (2013.01); *G02C 9/00* (2013.01); *G02F 1/1337* (2013.01); *G02F 1/13363* (2013.01); *G02F 1/133638* (2021.01)

(58) Field of Classification Search
CPC ............................................. G02B 2027/0178
See application file for complete search history.

(56) References Cited

U.S. PATENT DOCUMENTS

| 2008/0212004 A1* | 9/2008 | Kawakami | G02F 1/1337 349/125 |
| 2014/0152944 A1* | 6/2014 | Zhao | G02F 1/1347 349/96 |
| 2020/0319504 A1* | 10/2020 | Kim | C09J 7/385 |

FOREIGN PATENT DOCUMENTS

TW    201804180    2/2018

OTHER PUBLICATIONS

S. M. Wood et al., "Wavelength Tuning of the Photonic Band Gap of an Achiral Nematic Liquid Crystal Filled into a Chiral Polymer Scaffold", Macromolecules, Nov. 3, 2016, pp. 8643-8652.
"Office Action of Taiwan Counterpart Application," dated Sep. 27, 2019, p. 1-p. 5.

* cited by examiner

*Primary Examiner* — Richard H Kim
(74) *Attorney, Agent, or Firm* — JCIPRNET

(57) ABSTRACT

An ocular optical system including an eyewear device and a tunable light attenuator is provided. The tunable light attenuator is disposed on a light path which the eyewear device is disposed on and includes a plurality of cholesteric liquid crystal layers, a plurality of electrode layers, and a controller. Each of the cholesteric liquid crystal layers is disposed between two of the electrode layers. The controller is electrically connected to the electrode layers and configured to adjust voltages applied to the electrode layers so as to operate the cholesteric liquid crystal layers in at least two steps of light attenuation for randomly polarized light with at least one of a blue band and an ultraviolet band.

16 Claims, 9 Drawing Sheets

OCULAR OPTICAL SYSTEM

CROSS-REFERENCE TO RELATED APPLICATION

This application claims the priority benefit of U.S. provisional application Ser. No. 62/646,384, filed on Mar. 22, 2018. The entirety of the above-mentioned patent application is hereby incorporated by reference herein and made a part of this specification.

BACKGROUND OF THE INVENTION

1. Field of the Invention

The invention generally relates to an optical system and, in particular, to an ocular optical system.

2. Description of Related Art

With the development of display technology or optical technology, eyewear devices are diversified. For example, eyewear devices may be glasses, goggles, virtual reality (VR) displays, augmented reality (AR) displays, etc. To prevent the human eye from being damaged by blue light, an anti-blue light coating is coated on the eyewear device.

However, the transmittance of the anti-blue light coating cannot be adjusted after the coating is coated on the eyewear device. A strong blue light reduction effect is easy to cause the color of an environmental image to be distorted, but a weak blue light reduction effect is easy to have no protection effect for human eye when the environmental blue light is too strong.

Therefore, the solution of using the anti-blue light coating cannot be suitable for various environments or situations, for example, a dark environment and an environment with strong blue or ultraviolet light.

SUMMARY OF THE INVENTION

Accordingly, the invention is directed to an ocular optical system capable of achieving an adjustable light attenuation effect for various environments.

According to an embodiment of the invention, an ocular optical system including an eyewear device and a tunable light attenuator is provided. The tunable light attenuator is disposed on a light path which the eyewear device is disposed on and includes a plurality of cholesteric liquid crystal layers, a plurality of electrode layers, and a controller. Each of the cholesteric liquid crystal layers is disposed between two of the electrode layers. The controller is electrically connected to the electrode layers and configured to adjust voltages applied to the electrode layers so as to operate the cholesteric liquid crystal layers in at least two steps of light attenuation for randomly polarized light with at least one of a blue band and an ultraviolet band.

In the ocular optical system according to the embodiment of the invention, since the states of the cholesteric liquid crystal layers can be adjusted by the controller, the ocular optical system is capable of achieving an adjustable blue or ultraviolet light attenuation effect for various environments.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 9A is the transmittance spectrum of the tunable light attenuator in FIG. 1B when both the liquid crystal cells are turned on.

FIG. 9B is the transmittance spectrum of the tunable light attenuator in the embodiment of FIG. 1A and FIG. 1B when one of the liquid crystal cells is turned on.

DESCRIPTION OF THE EMBODIMENTS

Figure 1A:
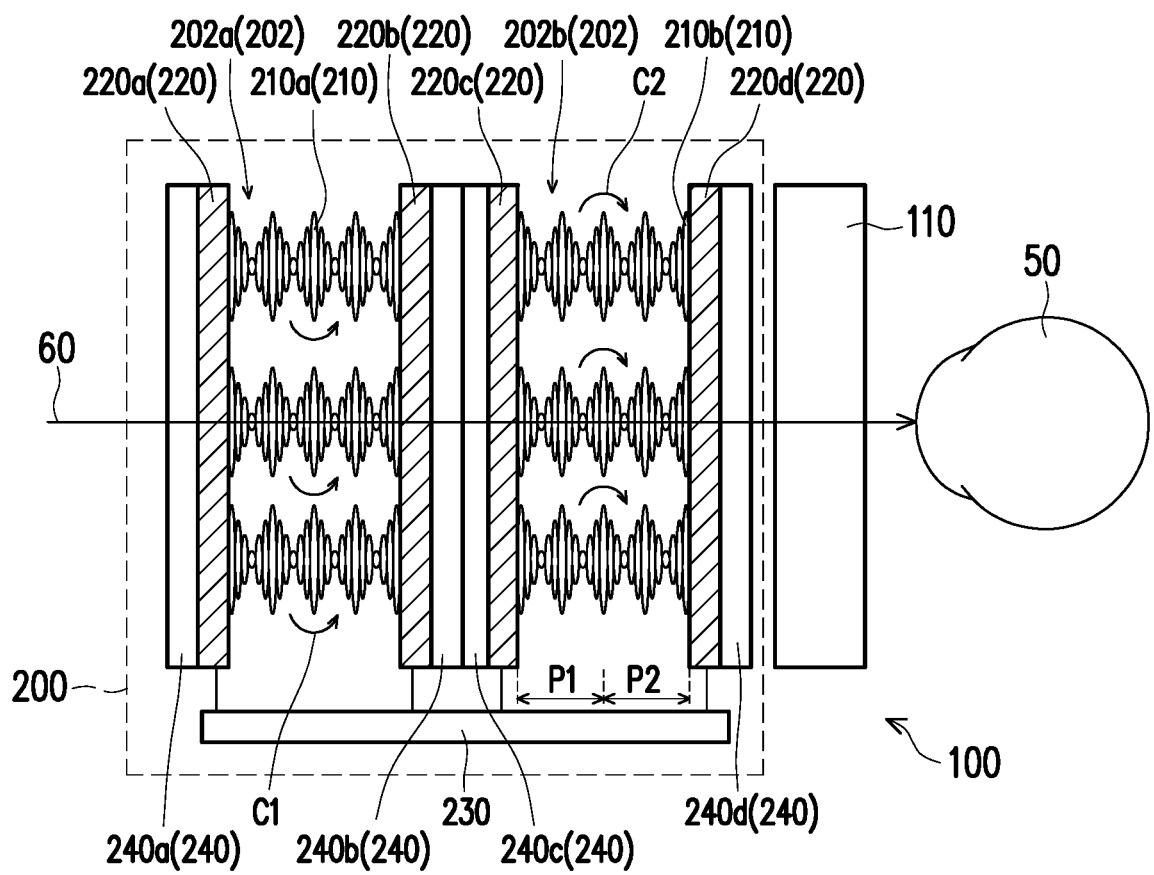
FIG. 1A and FIG. 1B are schematic cross-sectional views of an ocular optical system according to an embodiment of the invention in two operation modes, respectively.

Reference will now be made in detail to the present embodiments of the invention, examples of which are illustrated in the accompanying drawings. Wherever possible, the same reference numbers are used in the drawings and the description to refer to the same or like parts.

Figure 1B:
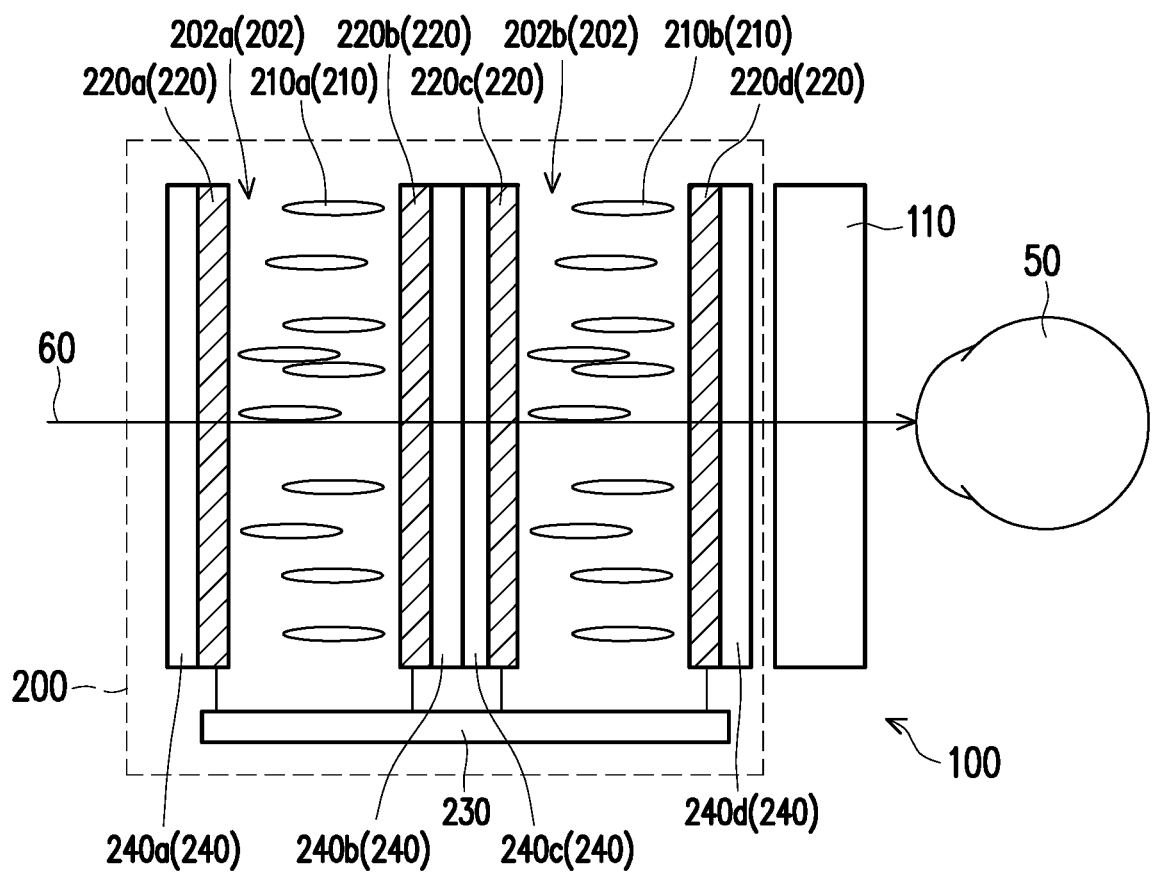

FIG. 1A and FIG. 1B are schematic cross-sectional views of an ocular optical system according to an embodiment of the invention in two operation modes, respectively. Referring to FIG. 1A and FIG. 1B, the ocular optical system 100 in this embodiment includes an eyewear device 110 and a tunable light attenuator 200. The eyewear device 110 is, for example, a VR display, an AR display, goggles, glasses, or any other eyewear device. The tunable light attenuator 200 is disposed on a light path 60 which the eyewear device 110 is disposed on and includes a plurality of cholesteric liquid crystal layers 210 (e.g. cholesteric liquid crystal layers 210a and 210b), a plurality of electrode layers 220 (e.g. electrode layers 220a, 220b, 220c, and 220d), and a controller 230. Each of the cholesteric liquid crystal layers 210 is disposed between two of the electrode layers 220. For example, the cholesteric liquid crystal layer 210a is disposed between the electrode layer 220a and the electrode layer 220b, and the cholesteric liquid crystal layer 210b is disposed between the electrode layer 220c and the electrode layer 220d.

In this embodiment, the tunable light attenuator 200 further includes a plurality of substrates 240 (e.g. substrates 240a, 240b, 240c, and 240d), wherein the electrode layers 220 are respectively disposed on the substrates 240. In this embodiment, the electrode layers 220a, 220b, 220c, and 220d are respectively disposed on the substrates 240a, 240b, 240c, and 240d.

In this embodiment, each of the cholesteric liquid crystal layers 210 includes chiral nematic liquid crystals without polymer. The chiral nematic liquid crystals may include nematic liquid crystals doped with a chiral dopant. The electrode layers 220 may be transparent conductive layers made of, for example, indium tin oxide or any other metal oxide having good conductivity. The substrates 240 may be transparent substrates such as glass substrates or plastic substrates. The substrates 240a and 240b, the electrode layers 220a and 220b, and the cholesteric liquid crystal layer 210a can form a liquid crystal cell 202, e.g. the liquid crystal cell 202a. The substrates 240c and 240d, the electrode layers 220c and 220d, and the cholesteric liquid crystal layer 210b can form a liquid crystal cell 202, e.g. the liquid crystal cell 202b. In this embodiment, the tunable light attenuator 200 includes two liquid crystal cells 202. However, in other embodiments, the tunable light attenuator 200 may include three or more liquid crystal cells 202.

The controller 230 is electrically connected to the electrode layers 220 and configured to adjust voltages applied to the electrode layers 220 so as to operate the cholesteric liquid crystal layers 210 in at least two steps of light attenuation for randomly polarized light with at least one of a blue band and an ultraviolet band. For example, when there is no voltage difference between the electrode layer 220a and the electrode layer 220b and between the electrode layer 220c and the electrode layer 220d, the liquid crystals in the cholesteric liquid crystal layers 210 are arranged spirally as shown in FIG. 1A. By the design of the spiral pitch of the cholesteric liquid crystals, the reflectance spectrum of the cholesteric liquid crystal layers 210 is determined. In this embodiment, the spiral pitch of the cholesteric liquid crystals in the cholesteric liquid crystal layers 210 is designed to be a certain value that causes the cholesteric liquid crystal layers 210 to be capable of reflecting at least one of blue light and ultraviolet light. When there is a voltage difference between the electrode layer 220a and the electrode layer 220b and between the electrode layer 220c and the electrode layer 220d, the liquid crystals in the cholesteric liquid crystal layers 210 stand about vertically, so that the blue light and the ultraviolet light can penetrate through the cholesteric liquid crystal layers 210. Therefore, the ocular optical system 100 in this embodiment is capable of achieving an adjustable blue or ultraviolet light attenuation effect for various environments.

In this embodiment, the cholesteric liquid crystal layers 210 have right-handed chirality C1 and left-handed chirality C2. For example, the cholesteric liquid crystal layer 210a has right-handed chirality C1 to reflect right-handed rotation light (i.e. right-handed circularly polarized light) with at least one of the blue band and the ultraviolet band, and the cholesteric liquid crystal layer 210b has left-handed chirality C2 to reflect left-handed rotation light (i.e. left-handed circularly polarized light) with at least one of the blue band and the ultraviolet band, so that the whole of the cholesteric liquid crystal layers 210a and 210b can reflect randomly polarized light with at least one of the blue band and the ultraviolet band. However, in other embodiments, the cholesteric liquid crystal layer 210a may have left-handed chirality C2, and the cholesteric liquid crystal layer 210b may have right-handed chirality C1.

In this embodiment, the controller 230 may be designed through hardware description languages (HDL) or any other design methods for digital circuits familiar to people skilled in the art and may be a hardware circuit implemented through a field programmable gate array (FPGA), a complex programmable logic device (CPLD), or an application-specific integrated circuit (ASIC). Alternatively, the controller 230 may be a processor having computational capability.

In this embodiment, the eyewear device 110 is disposed between the tunable light attenuator 200 and the eye 50 of a user, so that the tunable light attenuator 200 can attenuate the blue or ultraviolet light from the environment to protect the eye 50, and the ratio of light attenuation can be adjusted according to actual requirements. In addition, since the blue light from the environment is filtered out to reduce dispersion of light, the sharpness of image of the object in the environment may be increased, and the combining effect of the virtual image provided by the eyewear device 110 and the image of the environmental object is better in the case that the eyewear device 110 is, for example, a VR display or an AR display.

Figure 2:
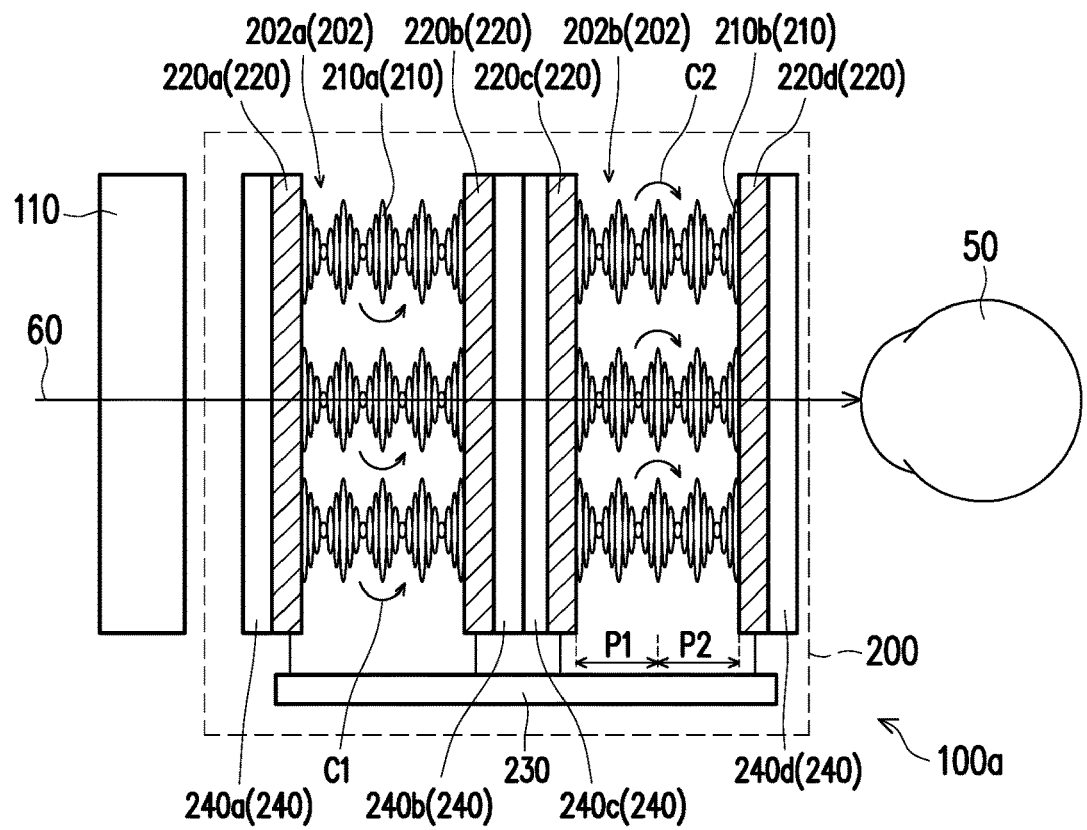
FIG. 2 is a schematic cross-sectional view of an ocular optical system according to another embodiment of the invention.

FIG. 2 is a schematic cross-sectional view of an ocular optical system according to another embodiment of the invention. Referring to FIG. 2, the ocular optical system 100a in this embodiment is similar to the ocular optical system 100 in FIG. 1A and FIG. 1B, and the difference therebetween is as follows. In the ocular optical system 100a in this embodiment, the tunable light attenuator 200 is disposed between the eyewear device 110 and the eye 50, so that the tunable light attenuator 200 can attenuate the blue or ultraviolet light from both the environment and the eyewear device 110, so as to protect the eye 50.

Figure 3:
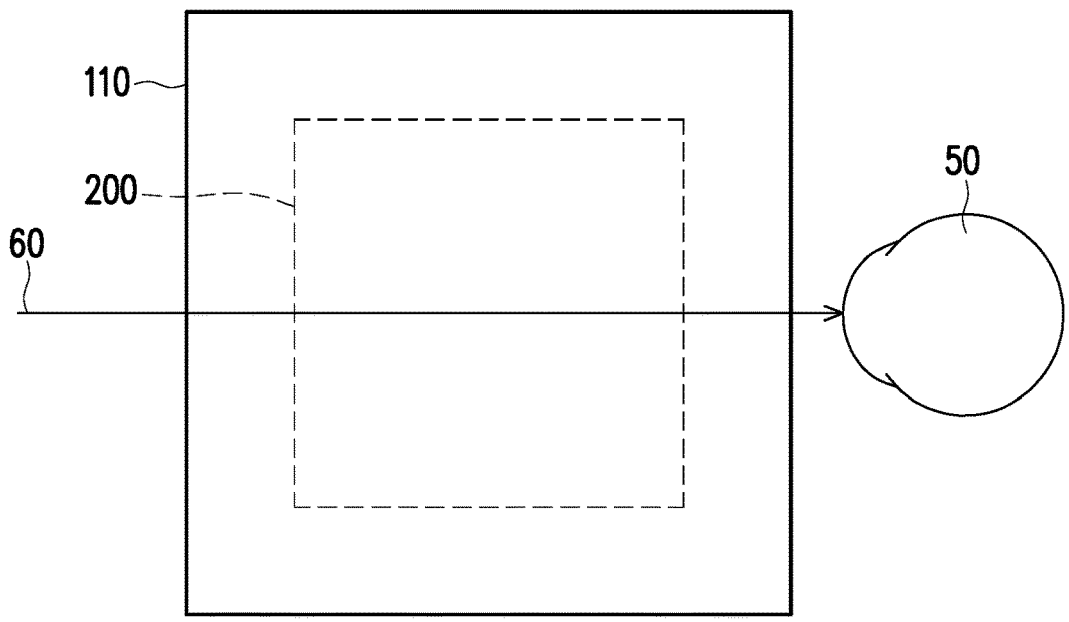
FIG. 3 is a schematic cross-sectional view of an ocular optical system according to another embodiment of the invention.

FIG. 3 is a schematic cross-sectional view of an ocular optical system according to another embodiment of the invention. Referring to FIG. 3, the ocular optical system 100b in this embodiment is similar to the ocular optical system 100 in FIG. 1A and FIG. 1B, and the difference therebetween is as follows. In the ocular optical system 100b according to this embodiment, the tunable light attenuator 200 is embedded in the eyewear device 110. For example, the tunable light attenuator 200 is disposed in the light path, e.g. the light path of an image beam, inside the eyewear device 110, so as to protect the eye 50.

Figure 4:
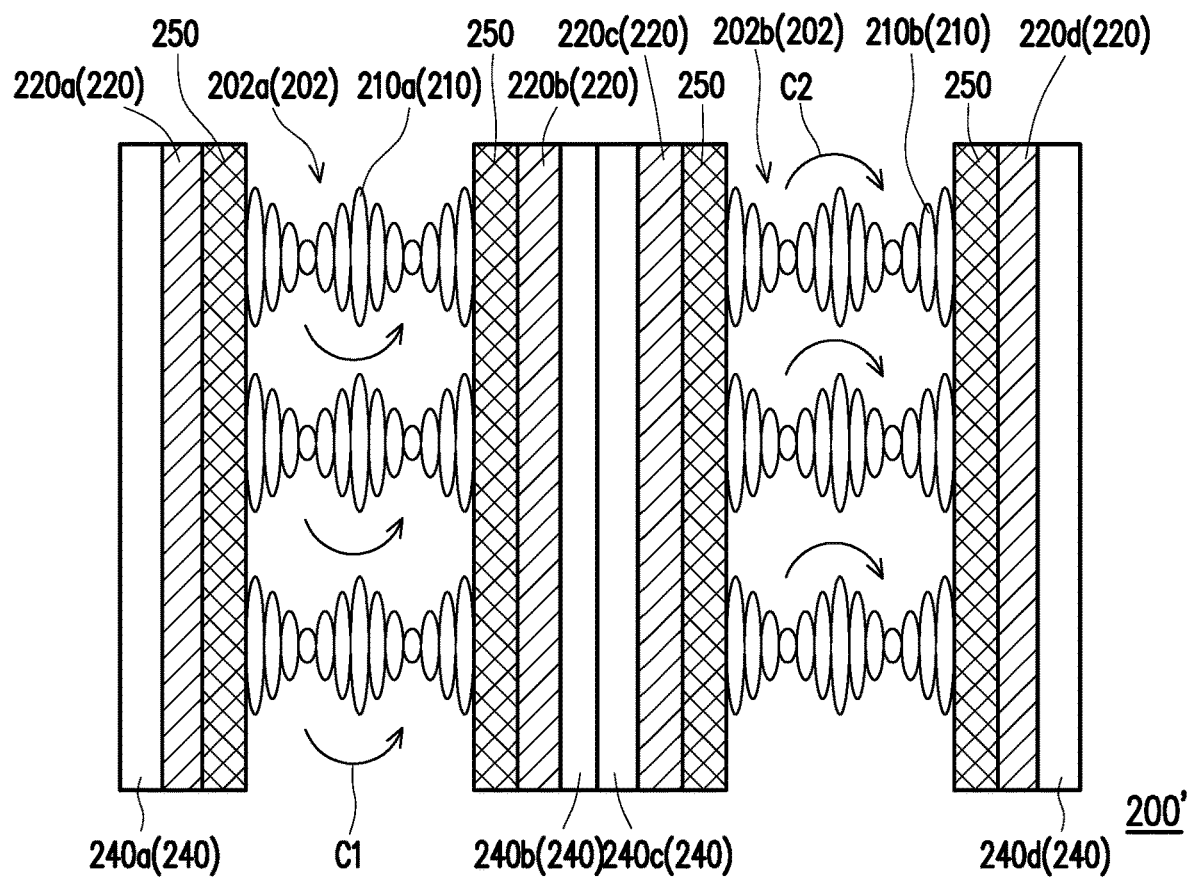
FIG. 4 is a schematic cross-sectional view of a tunable light attenuator according to another embodiment of the invention.

FIG. 4 is a schematic cross-sectional view of a tunable light attenuator according to another embodiment of the invention. Referring to FIG. 4, the tunable light attenuator 200' in this embodiment is similar to the tunable light attenuator 200 in FIG. 1A and FIG. 1B, and the difference therebetween is as follows. The tunable light attenuator 200' according to this embodiment further includes a plurality of alignment layers 250 respectively disposed on the electrode layers 220, and each of the cholesteric liquid crystal layers 210 is disposed between and contacts with two of the alignment layers 250. The initial orientation of liquid crystals can be determined by the alignment layers 250. In this embodiment, the material of the alignment layers 250 includes silicon oxide that less absorbs blue light or ultraviolet light.

Figure 5:
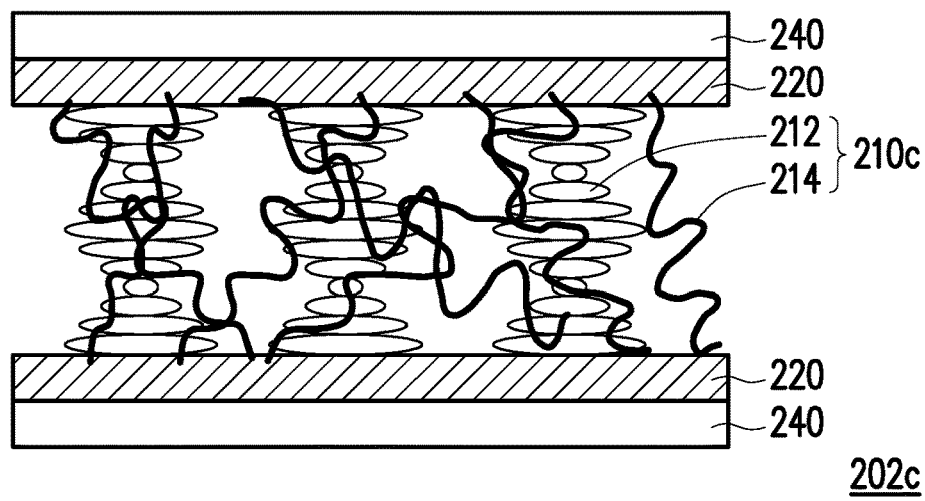
FIG. 5 is a schematic cross-sectional view of a liquid crystal cell according to another embodiment of the invention.

FIG. 5 is a schematic cross-sectional view of a liquid crystal cell according to another embodiment of the invention. Referring to FIG. 5, the liquid crystal cell 202c in this embodiment is similar to the liquid crystal cell 202 in FIG. 1A and FIG. 1B, and the difference therebetween is as follows. In the liquid crystal cell 202c according to this embodiment, the cholesteric liquid crystal layer 210c includes polymer-stabilized chiral nematic liquid crystals or achiral nematic liquid crystals with a chiral polymer scaffold. For example, the cholesteric liquid crystal layer 210c includes liquid crystals 212 and polymer 214 among the liquid crystals 212. In the case that the cholesteric liquid crystal layer 210c includes polymer-stabilized chiral nematic liquid crystals, the liquid crystals 212 are chiral nematic liquid crystals, for example. On the other hand, in the case that the cholesteric liquid crystal layer 210c includes achiral nematic liquid crystals with a chiral polymer scaffold, the liquid crystals 212 are achiral nematic liquid crystals, and the polymer 214 is a chiral polymer scaffold, for example. The achiral nematic liquid crystals with a chiral polymer scaffold may be made by the following steps. First, polymer is doped in chiral nematic liquid crystals to form the chiral polymer scaffold among the chiral nematic liquid crystals. Next, the chiral nematic liquid crystals are removed to form the chiral polymer scaffold with pores. Then, the pores are filled with achiral nematic liquid crystals, so as to form the achiral nematic liquid crystals with the chiral polymer scaffold.

Figure 6:
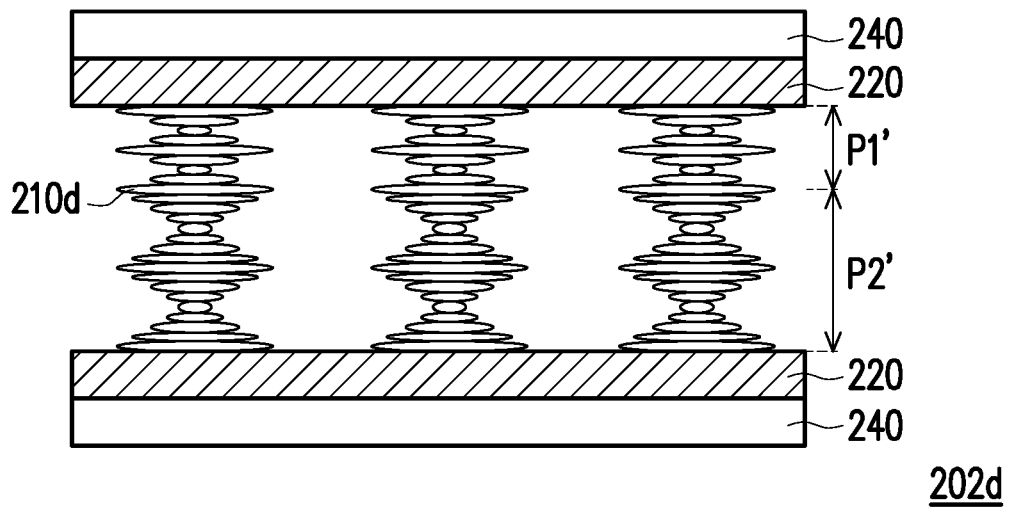
FIG. 6 is a schematic cross-sectional view of a liquid crystal cell according to another embodiment of the invention.

FIG. 6 is a schematic cross-sectional view of a liquid crystal cell according to another embodiment of the invention. Referring to FIG. 6, the liquid crystal cell 202d in this embodiment is similar to the liquid crystal cell 202 in FIG. 1A and FIG. 1B, and the difference therebetween is as follows. In the liquid crystal cells 202 in FIG. 1A and FIG. 1B, each of the cholesteric liquid crystal layers 210 has a constant pitch; for example, the spiral pitch P1 is the same as the spiral pitch P2. However, in the liquid crystal cell 202d in FIG. 6 in this embodiment, the cholesteric liquid crystal layer 210d has gradually increasing pitches from one side thereof to another side thereof; for example, the spiral pitch P2' is greater than the spiral pitch P1'. In FIG. 1A, FIG. 1B, and FIG. 6, the cholesteric liquid crystal layer 210, 210d are schematically shown to have two spiral periods, but in fact, the cholesteric liquid crystal layer 210, 210d may have three or more spiral periods, for example, about ten spiral periods.

Since each of the spiral pitches corresponds to one kind of reflectance spectrum, the cholesteric liquid crystal layer 210d having gradually increasing pitches from one side thereof to another side thereof in this embodiment can broaden the wavelength range for reflection.

Figure 7:
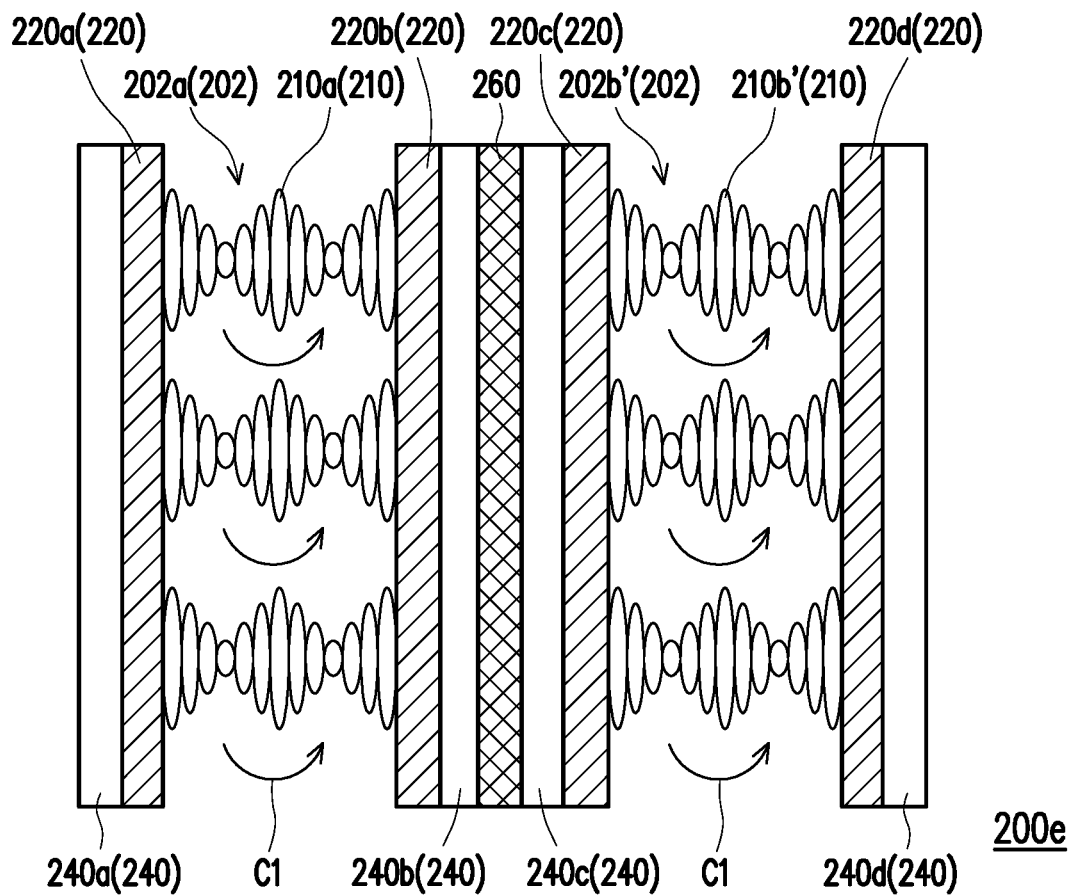
FIG. 7 is a schematic cross-sectional view of a tunable light attenuator according to another embodiment of the invention.

FIG. 7 is a schematic cross-sectional view of a tunable light attenuator according to another embodiment of the invention. Referring to FIG. 7, the tunable light attenuator 200e in this embodiment is similar to the tunable light attenuator 200 in FIG. 1A and FIG. 1B, and the difference therebetween is as follows. In the tunable light attenuator 200e according to this embodiment, the cholesteric liquid crystal layers 210 (e.g. the cholesteric liquid crystal layers 210a and 210b') have the same chirality. For example, both the cholesteric liquid crystal layers 210a and 210b' have right-handed chirality C1. However, in other embodiments, both the cholesteric liquid crystal layers 210a and 210b' may have left-handed chirality C2. Moreover, in this embodiment, the tunable light attenuator 200e further includes a wave plate, e.g. a half wave plate 260, disposed between two adjacent cholesteric liquid crystal layers 210a and 210b', for example, between two adjacent liquid crystal cells 202a and 202b'.

The randomly polarized light may be deemed a combination of right-handed circularly polarized light and left-handed circularly polarized light. The right-handed circularly polarized light can be attenuated by the cholesteric liquid crystal layer 210a with right-handed chirality C1. The left-handed circularly polarized light passes through the cholesteric liquid crystal layer 210a, is converted into right-handed circularly polarized light by the half wave plate 260, and is attenuated by the cholesteric liquid crystal layer 210b' in sequence. Therefore, randomly polarized light can be attenuated by the tunable light attenuator 200e. The tunable light attenuator 200e may adopt one kind of cholesteric liquid crystal to achieve the effect of reflecting randomly polarized light, so as to reduce the cost of the tunable light attenuator 200e.

Figure 8A:
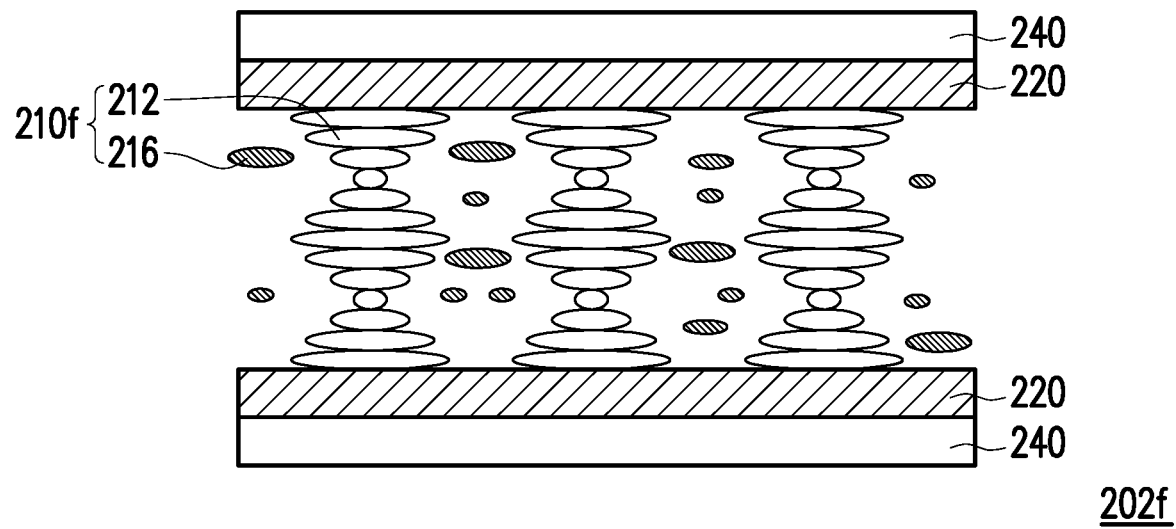
FIG. 8A and FIG. 8B are schematic cross-sectional views of a liquid crystal cell according to another embodiment of the invention in two operation modes, respectively.
Figure 8B:
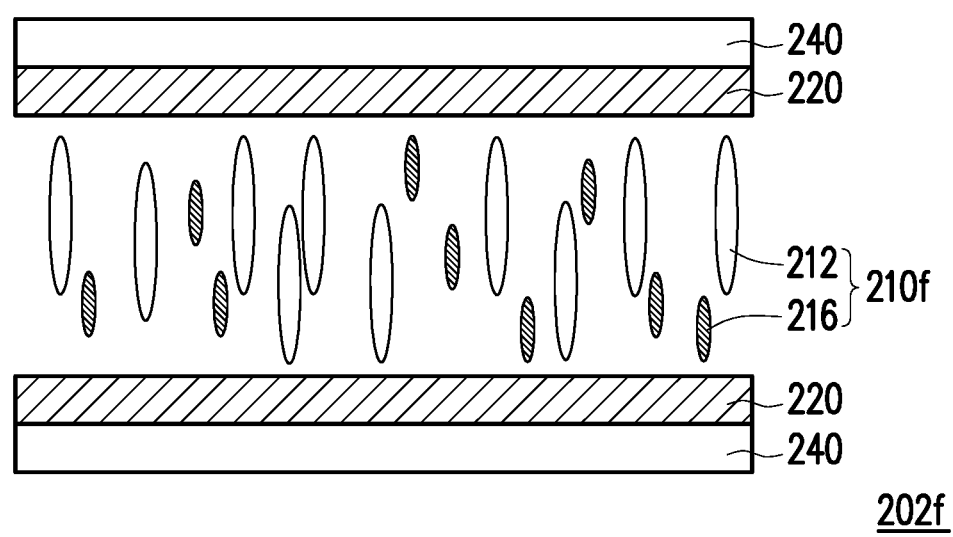

FIG. 8A and FIG. 8B are schematic cross-sectional views of a liquid crystal cell according to another embodiment of the invention in two operation modes, respectively. Referring to FIG. 8A and FIG. 8B, the liquid crystal cell 202f in this embodiment is similar to the liquid crystal cell 202 in FIG. 1A and FIG. 1B, and the difference therebetween is as follows. In the liquid crystal cell 202f according to this embodiment, the cholesteric liquid crystal layer 210f includes cholesteric liquid crystals 212 added with an additive 216, for example, dye molecules or nano-particles, so as to control a transmission spectrum of the tunable light attenuator. The additive 216 may block light with some wavelength range or increase the light attenuation. The additive 216 may be dichroic dye, and the light absorption of dichroic dye molecules is related to the orientation of the dichroic dye molecules. The orientation of the dichroic dye molecules is rotated with the rotation of the liquid crystals, so that the light absorption values in different operation modes in FIG. 8A and FIG. 8B with different orientations of dichroic dye molecules are different.

Figure 9A:
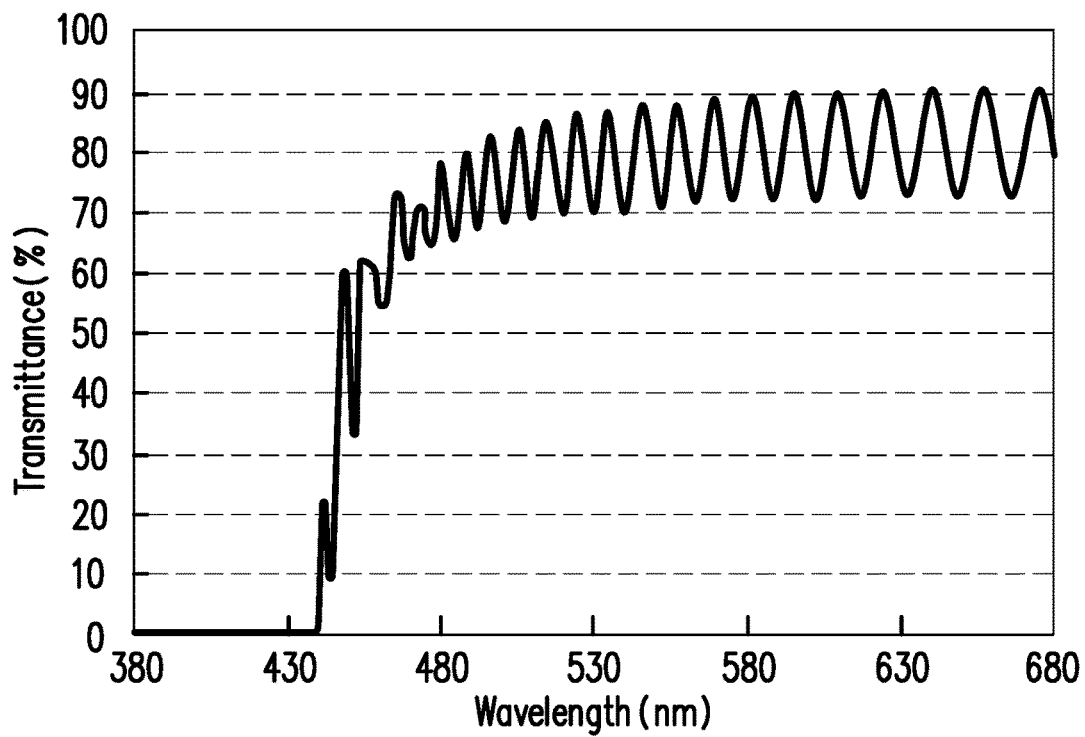
Figure 9B:
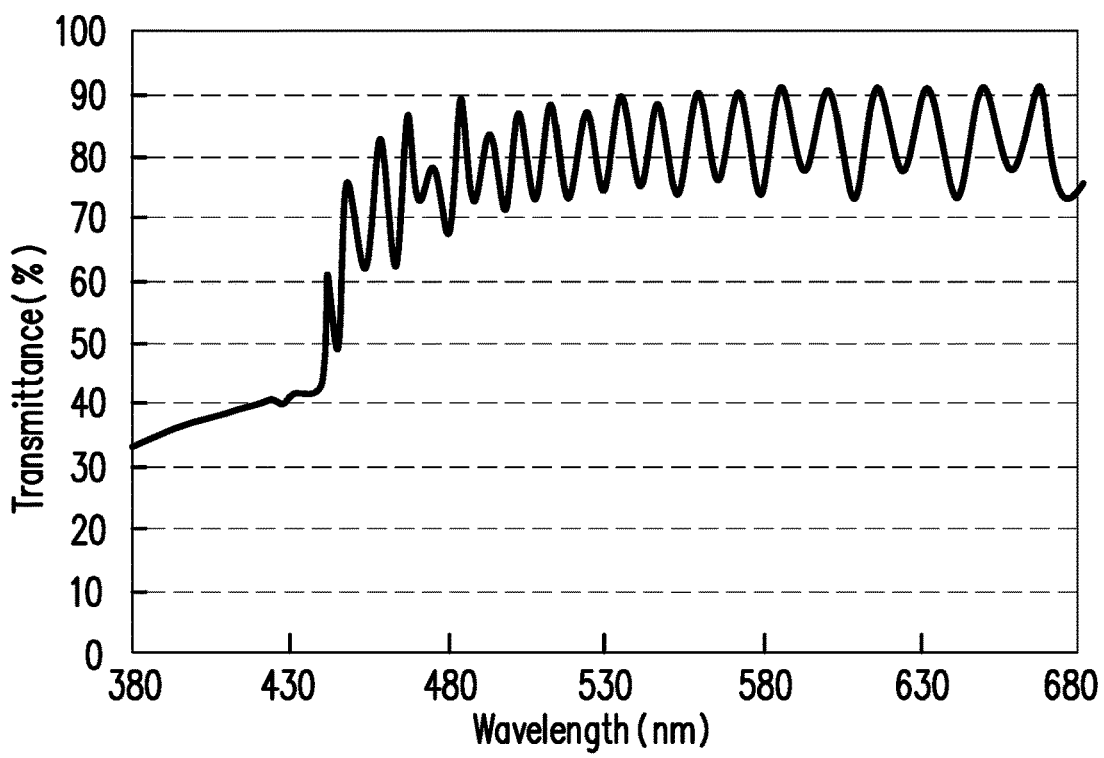
Figure 9C:
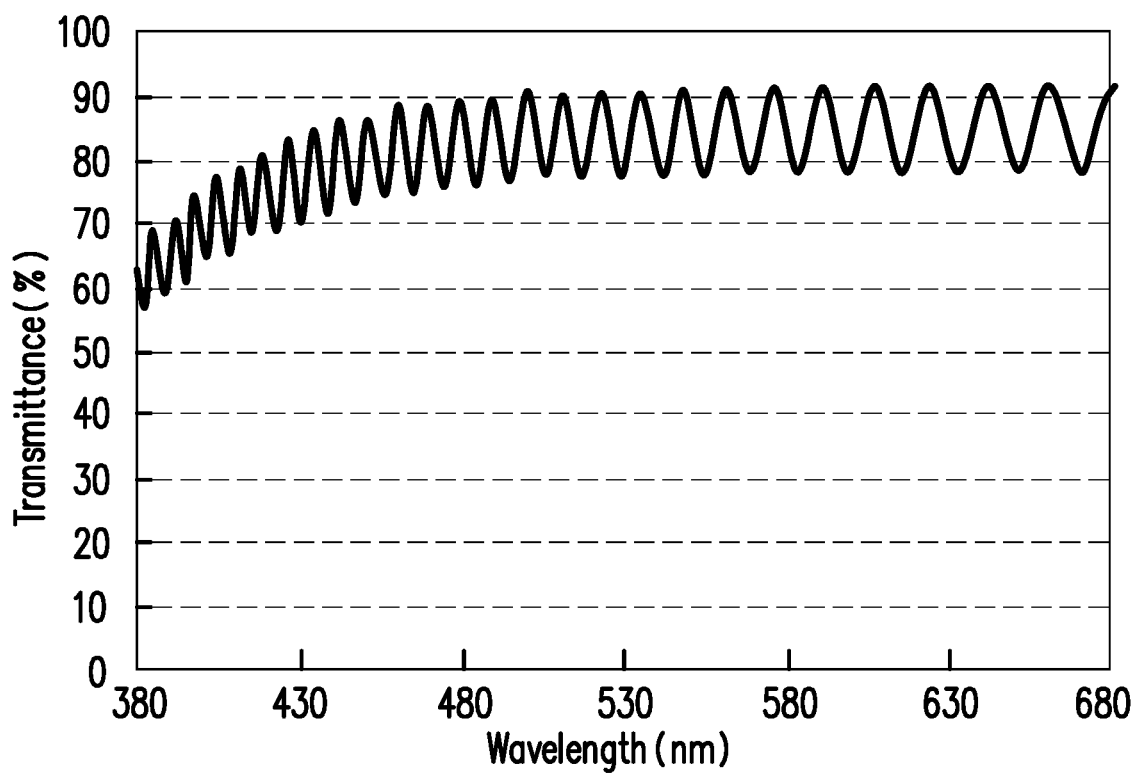
FIG. 9C is the transmittance spectrum of the tunable light attenuator in FIG. 1A when both the liquid crystal cells are turned off.

FIG. 9A is the transmittance spectrum of the tunable light attenuator in FIG. 1B when both the liquid crystal cells are turned on, FIG. 9B is the transmittance spectrum of the tunable light attenuator in the embodiment of FIG. 1A and FIG. 1B when one of the liquid crystal cells is turned on, and FIG. 9C is the transmittance spectrum of the tunable light attenuator in FIG. 1A when both the liquid crystal cells are turned off. Please refer to FIG. 1A, FIG. 1B, and FIG. 9A to FIG. 9C. From FIG. 9A to FIG. 9B, it can be learned that the tunable light attenuator 200 is capable of adjusting the light attenuation for short wavelength light. Moreover, "a liquid crystal cell is turned on" may mean that there is a voltage difference between the two electrode layers 220, and "a liquid crystal cell is turned off" may mean that there is no voltage difference between the two electrode layers 220.

Figure 10A:
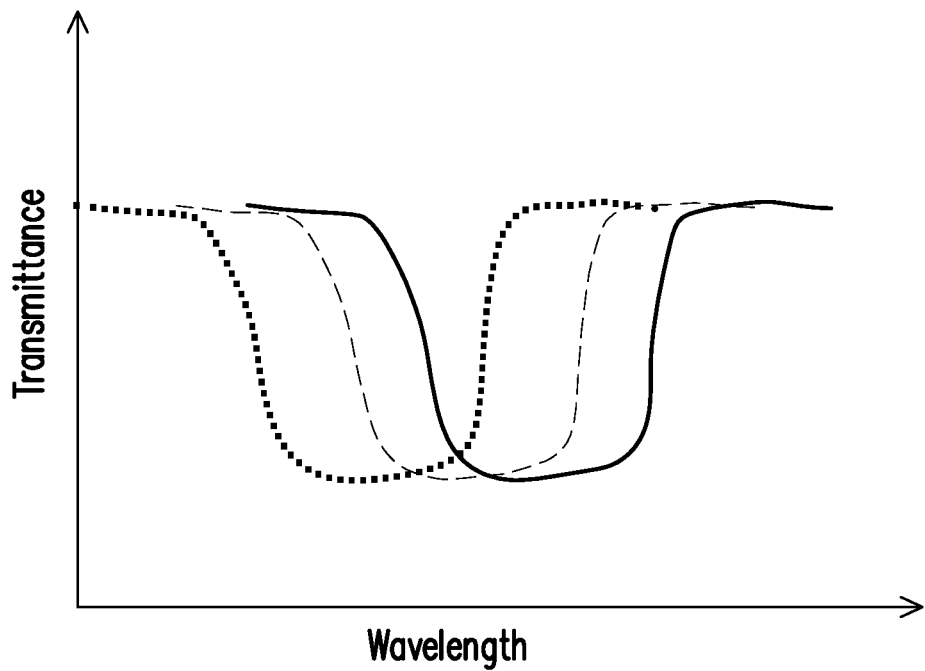
FIG. 10A is a schematic transmittance spectrum showing a wavelength range of the light attenuation being shifted when the voltages applied to the liquid crystal cells are adjusted in the embodiment of FIG. 5 in the case that the cholesteric liquid crystal layers thereof include achiral nematic liquid crystals with a chiral polymer scaffold.
Figure 10B:
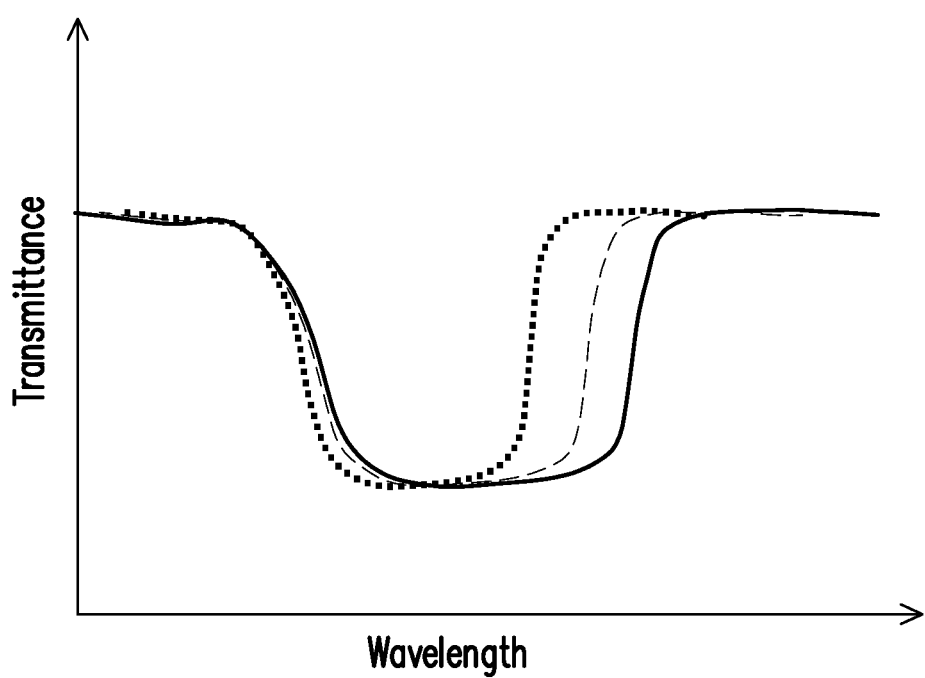
FIG. 10B is a schematic transmittance spectrum showing a wavelength range of the light attenuation being narrowed or broadened when the voltages applied to the liquid crystal cells are adjusted in the embodiment of FIG. 5 in the case that the cholesteric liquid crystal layers thereof include polymer-stabilized chiral nematic liquid crystals.

FIG. 10A is a schematic transmittance spectrum showing a wavelength range of the light attenuation being shifted when the voltages applied to the liquid crystal cells are adjusted in the embodiment of FIG. 5 in the case that the cholesteric liquid crystal layers thereof include achiral nematic liquid crystals with a chiral polymer scaffold. FIG. 10B is a schematic transmittance spectrum showing a wavelength range of the light attenuation being narrowed or broadened when the voltages applied to the liquid crystal cells are adjusted in the embodiment of FIG. 5 in the case that the cholesteric liquid crystal layers thereof include polymer-stabilized chiral nematic liquid crystals. Referring to FIG. 10A, in the case that a tunable light attenuator uses the liquid crystal cells 202c shown in FIG. 5 of which the cholesteric liquid crystal layers 210c include achiral nematic liquid crystals with a chiral polymer scaffold, when the voltages applied to the electrode layers 220 are adjusted, the wavelength range of the light attenuation is shifted, for example, shifted from one spectrum curve to another spectrum curve in FIG. 10A. Referring to FIG. 10B, in the case that a tunable light attenuator uses the liquid crystal cells 202c shown in FIG. 5 of which the cholesteric liquid crystal layers 210c include polymer-stabilized chiral nematic liquid crystals, when the voltages applied to the electrode layers 220 are adjusted, the wavelength range of the light attenuation is narrowed or broadened, for example, varied from on spectrum curve to another spectrum curve in FIG. 10B.

In conclusion, in the ocular optical system according to the embodiment of the invention, since the states of the cholesteric liquid crystal layers can be adjusted by the controller, the ocular optical system is capable of achieving an adjustable blue or ultraviolet light attenuation effect for various environments.

It will be apparent to those skilled in the art that various modifications and variations can be made to the structure of the invention without departing from the scope or spirit of the invention. In view of the foregoing, it is intended that the invention covers modifications and variations of this invention provided they fall within the scope of the following claims and their equivalents.

What is claimed is:

1. An ocular optical system comprising:
   an eyewear device; and
   a tunable light attenuator disposed on a light path which the eyewear device is disposed on and comprising:
      a plurality of cholesteric liquid crystal layers;
      a plurality of electrode layers, wherein each of the cholesteric liquid crystal layers is disposed between two of the electrode layers; and
      a controller electrically connected to the electrode layers and configured to adjust voltages applied to the electrode layers so as to operate the cholesteric liquid crystal layers in at least two steps of light attenuation for randomly polarized light with at least one of a blue band and an ultraviolet band, the light attenuation of the blue band and the ultraviolet band is more than light attenuation of a visible band other than the blue band,
   wherein a spiral pitch of cholesteric liquid crystals in the cholesteric liquid crystal layers is designed to be at least one value that causes the cholesteric liquid crystal layers to be capable of reflecting at least one of blue light and ultraviolet light more than reflecting a visible light band other than the blue light.

2. The ocular optical system according to claim 1, wherein the tunable light attenuator further comprises a plurality of substrates, wherein the electrode layers are respectively disposed on the substrates.

3. The ocular optical system according to claim 1, wherein the tunable light attenuator further comprises a plurality of alignment layers respectively disposed on the electrode layers, and each of the cholesteric liquid crystal layers is disposed between and contacts with two of the alignment layers.

4. The ocular optical system according to claim 3, wherein a material of the alignment layers comprises silicon oxide.

5. The ocular optical system according to claim 1, wherein each of the cholesteric liquid crystal layers comprises chiral nematic liquid crystals without polymer, polymer-stabilized chiral nematic liquid crystals, or achiral nematic liquid crystals with a chiral polymer scaffold.

6. The ocular optical system according to claim 1, wherein each of the cholesteric liquid crystal layers has a constant pitch.

7. The ocular optical system according to claim 1, wherein each of the cholesteric liquid crystal layers has gradually increasing pitches from one side thereof to another side thereof.

8. The ocular optical system according to claim 1, wherein the cholesteric liquid crystal layers have right-handed chirality and left-handed chirality.

9. The ocular optical system according to claim 1, wherein the cholesteric liquid crystal layers have a same chirality, and the tunable light attenuator further comprises a wave plate disposed between two adjacent cholesteric liquid crystal layers.

10. The ocular optical system according to claim 1, wherein the cholesteric liquid crystal layers comprise cholesteric liquid crystals added with dye molecules or nanoparticles, so as to control a transmission spectrum.

11. The ocular optical system according to claim 1, wherein when the voltages are adjusted, a wavelength range of the light attenuation is shifted.

12. The ocular optical system according to claim 1, wherein when the voltages are adjusted, a wavelength range of the light attenuation is narrowed or broadened.

13. The ocular optical system according to claim 1, wherein the eyewear device is disposed between the tunable light attenuator and an eye of a user.

14. The ocular optical system according to claim 1, wherein the tunable light attenuator is disposed between the eyewear device and an eye of a user.

15. The ocular optical system according to claim 1, wherein the tunable light attenuator is embedded in the eyewear device.

16. The ocular optical system according to claim 1, wherein the eyewear device is a virtual reality display, an augmented reality display, goggles, or glasses.

* * * * *